March 13, 1962 G. FRÎES 3,025,012

DEVICE FOR RE-WINDING AN ENDLESS TAPE

Filed April 17, 1958 2 Sheets-Sheet 1

Inventor
Gustav Frîes
By
Holcombe, Wetherill & Brisebois
Attorneys

DEVICE FOR RE-WINDING AN ENDLESS TAPE

Filed April 17, 1958 2 Sheets-Sheet 2

Inventor
Gustav Frîes
By Holcombe, Wetherill & Brisebois
Attorneys

United States Patent Office 3,025,012
Patented Mar. 13, 1962

3,025,012

DEVICE FOR RE-WINDING AN ENDLESS TAPE

Gustav Fries, Heidelberg, Schlierbach, Germany, assignor to Research Interests Limited, London, England, a British company Filed Apr. 17, 1958, Ser. No. 729,138
1 Claim. (Cl. 242—55.19)

The present invention relates to a device for re-winding an endless tape which is rolled up in the form of an annular coil or roll. Such endless tapes can be used for a number of purposes, for example as sound records on which the sounds may be recorded and from which they may be reproduced either magnetically, optically or mechanically (by a stylus), or as carriers for picture films, for example for cinematography or publicity purposes. They may also be used as the typewriter ribbons.

The present invention consists in a device for re-winding an endless tape in which the annular roll of tape is disposed on a freely rotatable plate having a core part around which the coil is arranged, the core part comprising radial teeth, the outer faces of which constituting partial surfaces of a cone which tapers towards the plate. Preferably the gaps between adjacent teeth are greater than the width of the teeth.

According to a feature of the invention the teeth project from the peripheral surface of a cylindrical hub portion, the teeth tapering with decreasing height towards the edge of the peripheral surface which lies adjacent the plate where the teeth lie flush with the said peripheral surface to form a toothless circle thereat.

The plate with the core part and the tape roll disposed thereon may be located in a spool box which may be completely closed except for one or more openings through which the tape passes on leaving and entering the box.

According to a further feature of the invention, the cover of the spool box is preferably provided with rollers on its inner surface against which the edge of the coil, opposite to that which engages with the plate, may roll. With this construction, the tape can be unwound from and re-wound in the spool box irrespective of the orientation of the spool box in space, which is particularly advantageous where the tape is used for example in portable dictating machines which are intended to be carried in and to operate while in a pocket of the user's clothing, or for use in recording phenomena in airplanes or rockets.

The device of this invention requires no complicated mechanism for re-winding and guiding the tape and does not require that the plate on which the tape is carried should be separately driven. The operation of withdrawing the tape from the roll suffices to drive the plate and effect correct re-winding.

By appropriate selection of the tape material, the device according to the invention can, while maintaining the same principles of construction, be used for rewinding endless tapes used for a variety of purposes. In addition to those previously mentioned, the tapes could be used as signal storers for electronic computers, or type storers for composing machines or typewriters.

Figure 5:
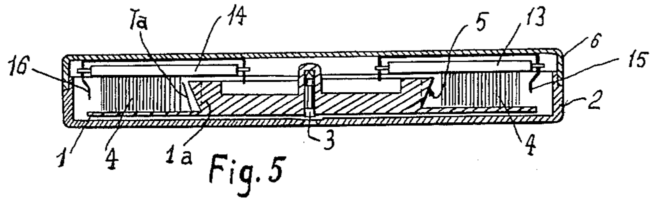
Figure 1:
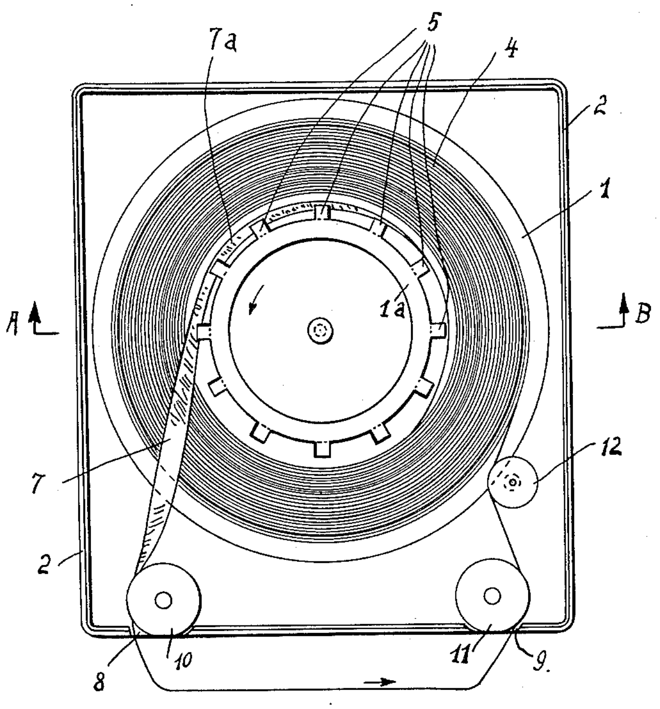
Figure 3:
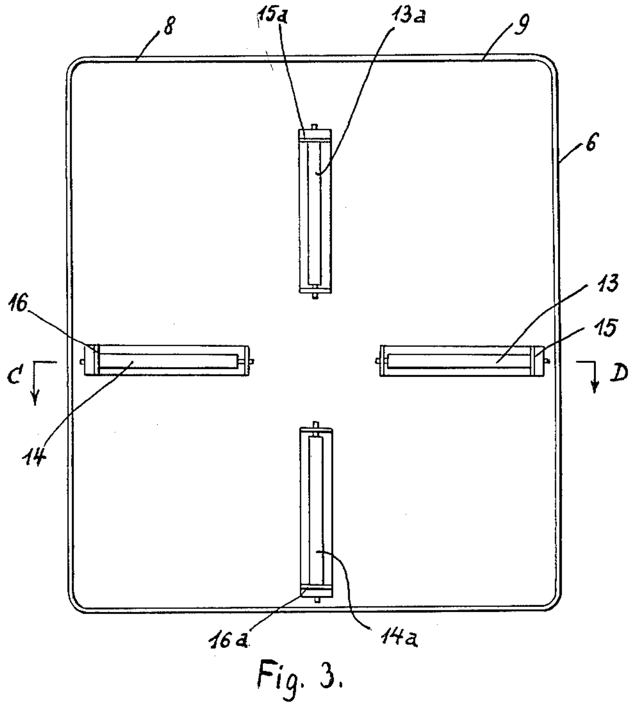
Figures 2, 4:
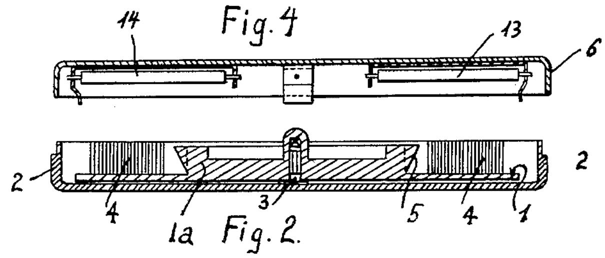

In order that the invention may be more clearly understood, reference will now be made to the accompanying drawings, in which:

FIGURE 1 shows in plan one embodiment of a spool box having an endless tape, the cover (shown in FIGURE 3) having been removed, FIGURE 2 is a section along the line A—B in FIGURE 1, FIGURE 3 is a plan view of the inside of the cover, FIGURE 4 is a section along the line C—D in FIGURE 3, FIGURE 5 is a section of the spool box and cover assembled together taken on the lines A—B of FIGURE 1 and C—D of FIGURE 3, and containing an endless tape.

The specific embodiment shown in the drawing is intended for carrying an endless magnetic sound tape having the standard width of 6.5 mm. Within the spool box is a disc-like plate 1 mounted for free rotation about a pivot 3 secured to the spool box. The plate 1 is provided with a core part 1*a* which rotates therewith and around which the endless tape 7, rolled up in the form of an annular roll 4 with the roll ends joined together, is disposed. The tape is withdrawn from the center of the roll at 7*a* and passes out of the spool box through the opening 8 in the wall thereof. After passing through the apparatus with which the tape is to be used, it re-enters the spool box through the opening 9 and is re-wound on the outside of the roll 4. The tape is guided over the rollers 10, 11 and 12.

In order to ensure satisfactory unwinding and re-winding of the tape, without the tape binding on the core part, the core part is specially constructed with teeth 5, shown as projecting from the peripheral surface of the cylindrical hub part of the core. The spaces between adjacent teeth are preferably greater than the width of the teeth. By this construction, when the tape 7 is withdrawn from 7*a* from the inside of the roll 4, it is impossible, even if the roll 4 should happen to be disposed eccentrically with reference to the core 1*a*, for the tape to become jammed on the core 1*a*, such jamming being prevented by the gaps between the teeth since these gaps provide spaces for the unhindered withdrawal of the tape even if the inner turn of the roll should itself be pressed against the teeth.

In practice the teeth 5 could be constructed as spokes without a hub part being provided. However, it has been found that when such a device is used with a magnetic sound tape, the sound is modulated at the frequency of the spoke spacing because the tape tends to be withdrawn jerkily from the coil 4. In order to eliminate this jerking, the teeth 5 are provided on the cylindrical hub 1*a* and are tapered so that their height decreases from the top of the core towards the plate 1 until the teeth lie flush with the surface of the cylindrical hub adjacent the plate to form a toothless circle thereat. Thus where the core 1*a* joins the plate 1, the core is truly circular whereby it is ensured, in practice, that the tape will be withdrawn without jerks and the plate will rotate uniformly.

In order to prevent the roll 4 from slipping off the edge of the plate 1, the guide members 15, 15*a*, 16, 16*a* are provided on the inside of the cover 6 which fits on to the spool box 2. They retain the outer turn of the roll as shown in FIGURE 5. In order that the spool box may be useable irrespective of its orientation in space, the inside of the cover 6 is also provided with rollers 13, 13*a*, 14, 14*a* which extend radially across the upper surface of the roll 4 as shown. If the device is being used with the roll 4 resting on the rollers 13, 14 the plate 1 presses the coil on to the rollers since the plate 1 is arranged not only to be rotatable but also axially movable on the pivot 3. For positions intermediate those in which the plate 1 is lowermost or uppermost, the device also operates satisfactorily.

While a particular embodiment has been described, it will be understood that various modifications may be made without departing from the scope of the invention. For example one or more of the rollers 10, 11 and 12 can be omitted, and if desired the tape may be led out of and into the spool box through narrow slots at 8 and 9 which may, if desired, be covered with velvet or the like so as to seal the spool box against dust and also against light, thus making the spool box suitable for accommodating light sensitive film.

It is advantageous to join the two ends of the tape together, to form the endless tape, by an inserted length of film or tape which is colored or otherwise distinguished so that it can be easily recognised when the coil has been completely re-wound once. Such an intermediate connecting piece or pieces, or some other appropriate part or parts of the tape, may be provided with markings, notches or metal parts by means of which, for example, the operation of the machine may be stopped or controlled when the tape roll has been completely re-wound, or for the purpose of selecting predetermined parts of the tape; for instance in automatic music boxes for enabling a particular part of the tape to be selected for playing.

I claim:

A cassette containing an endless tape in the form of an annular roll, said cassette comprising wall means defining a spool box containing said roll and provided with at least one aperture through which a loop of the endless tape extending from the inside turn to the outside turn of the roll passes outside said box, a cover closing said box, a pivot carried by said wall means and projecting into said box, a plate which is freely rotatable and axially movable on said pivot, a core connected to one side of said plate and upon which said roll of tape is mounted, one part of said core projecting from the plate on the side thereof facing the cover and having an axial length which is less than the width of the tape and being provided with teeth, the outer faces of which teeth are inclined relative to the plate to constitute partial surfaces of a core which tapers toward the plate, the plate and core part being rotatable by merely pulling on the loop of tape which extends outside the cassette, thereby causing the tape which is pulled off from the inside of the roll to be automatically wound up on the outside of the roll, resilient supports on the inside of the cover, freely running rollers carried on said resilient supports, said rollers extending substantially radially across and in resilient engagement with the edge of the roll remote from the plate, and means for keeping the outer turn of the roll within the confines of the plate.

References Cited in the file of this patent

UNITED STATES PATENTS

| | | |
|---|---|---|
| 1,211,955 | Millar | Jan. 9, 1917 |
| 2,238,719 | De Tartas | Apr. 15, 1941 |
| 2,301,858 | Danielson | Nov. 10, 1942 |
| 2,778,636 | Eash | Jan. 22, 1957 |
| 2,837,332 | Busch | June 3, 1958 |
| 2,922,642 | Cousino | Jan. 26, 1960 |

FOREIGN PATENTS

| | | |
|---|---|---|
| 880,013 | France | Dec. 10, 1942 |